United States Patent  
Thompson et al.

(10) Patent No.: US 10,084,587 B1
(45) Date of Patent: Sep. 25, 2018

(54) MULTIFUNCTION CHANNELIZER/DDC ARCHITECTURE FOR A DIGITAL RECEIVER/EXCITER

(71) Applicant: Raytheon Company, Waltham, MA (US)

(72) Inventors: Daniel Thompson, Hermosa Beach, CA (US); Harry B. Marr, Manhattan Beach, CA (US); Ian S. Robinson, Redondo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 0 days.

(21) Appl. No.: 15/663,308

(22) Filed: Jul. 28, 2017

(51) Int. Cl.
| | |
|---|---|
| *H04L 5/06* | (2006.01) |
| *G01S 3/04* | (2006.01) |
| *G01S 3/46* | (2006.01) |
| *G01S 3/48* | (2006.01) |
| *G01S 3/808* | (2006.01) |
| *H01Q 25/00* | (2006.01) |
| *H01Q 19/17* | (2006.01) |

(52) U.S. Cl.
CPC ............... *H04L 5/06* (2013.01); *G01S 3/043* (2013.01); *G01S 3/465* (2013.01); *G01S 3/48* (2013.01); *G01S 3/808* (2013.01); *H01Q 19/175* (2013.01); *H01Q 25/008* (2013.01)

(58) Field of Classification Search
USPC .................................. 375/340, 257; 320/137
See application file for complete search history.

(56) References Cited

U.S. PATENT DOCUMENTS

| | | |
|---|---|---|
| 2,989,744 A | 6/1961 | Pettit |
| 3,170,158 A | 2/1965 | Rotman |
| 3,720,952 A | 3/1973 | Lawsine |
| 3,992,099 A | 11/1976 | Laughlin |

(Continued)

FOREIGN PATENT DOCUMENTS

| | | |
|---|---|---|
| CA | 1229926 A1 | 12/1987 |
| CN | 101241535 A | 8/2008 |

(Continued)

OTHER PUBLICATIONS

International Search Report and Written Opinion for PCT/US2017/054862; International Filing Date, Oct. 3, 2017; dated Dec. 7, 2017; 5 pages.

(Continued)

*Primary Examiner* — Eva Puente
(74) *Attorney, Agent, or Firm* — Cantor Colburn LLP

(57) ABSTRACT

A digital receiver includes a digital synthesizer that generates a local oscillating (LO) signal at a selected frequency, and a signal mixer that receives an input signal and generates a mixed output signal in response to shifting a phase of the input signal based on the frequency of the LO signal. A multi-mode dynamic channelizer is selectively operable in a first mode and a second mode. The first mode generates a plurality of individual channels having a channel size defined by a bandwidth and a gain, and the second mode generates a parallelization of a selected channel. In response to operating in the second mode, the multi-mode dynamic channelizer adjusts at least one of the bandwidth and the gain of the selected channel based on the mixed output signal to change the channel size of the selected channel.

20 Claims, 4 Drawing Sheets

(56) References Cited

U.S. PATENT DOCUMENTS

| | | | |
|---|---|---|---|
| 4,328,496 A | 5/1982 | White | |
| 4,613,863 A | 9/1986 | Mitchell | |
| 5,032,839 A | 7/1991 | Even-Or | |
| 5,717,620 A | 2/1998 | Williams | |
| 6,052,085 A | 4/2000 | Hanson | |
| 6,091,704 A | 7/2000 | Butash | |
| 6,104,346 A | 8/2000 | Rudish | |
| 6,181,740 B1 | 1/2001 | Yasuda | |
| 6,222,409 B1 | 4/2001 | Kieda | |
| 6,285,197 B2 | 9/2001 | Walker et al. | |
| 6,898,235 B1 | 5/2005 | Carlin et al. | |
| 6,954,614 B2 | 10/2005 | Jespersen | |
| 7,801,228 B2 | 9/2010 | Lehne et al. | |
| 8,174,325 B1 | 5/2012 | Leung | |
| 8,578,256 B2 | 11/2013 | Graef | |
| 9,484,971 B2 | 11/2016 | Corbalis | |
| 2001/0011893 A1 | 8/2001 | Walker et al. | |
| 2001/0022811 A1 | 9/2001 | Lillington | |
| 2002/0010870 A1* | 1/2002 | Gardner | H04B 3/542 713/300 |
| 2003/0112904 A1 | 6/2003 | Fuller et al. | |
| 2003/0133524 A1 | 7/2003 | Miller et al. | |
| 2004/0189384 A1 | 9/2004 | Kemna et al. | |
| 2005/0156775 A1 | 7/2005 | Petre | |
| 2007/0223607 A1 | 9/2007 | Lehne et al. | |
| 2007/0223754 A1 | 9/2007 | Roeck | |
| 2009/0163161 A1 | 6/2009 | Robinson et al. | |
| 2009/0239551 A1 | 9/2009 | Woodsum | |
| 2010/0315292 A1 | 12/2010 | Ciu et al. | |
| 2011/0103430 A1 | 5/2011 | Witrisal | |
| 2011/0260911 A1 | 10/2011 | Sapp | |
| 2011/0274222 A1 | 11/2011 | Hinson | |
| 2012/0235646 A1* | 9/2012 | Lo | H02J 7/0013 320/137 |
| 2014/0105416 A1 | 4/2014 | Huttunen et al. | |
| 2014/0133603 A1 | 5/2014 | Velazquez | |
| 2014/0210666 A1 | 7/2014 | Maltsev et al. | |
| 2014/0241463 A1 | 8/2014 | Leenaerts et al. | |
| 2014/0286444 A1* | 9/2014 | Au | H04B 1/74 375/257 |
| 2015/0234030 A1 | 8/2015 | Marr | |

FOREIGN PATENT DOCUMENTS

| | | | |
|---|---|---|---|
| EP | 0344794 | A2 | 12/1989 |
| EP | 1596220 | B1 | 11/2005 |
| EP | 2425635 | A1 | 8/2013 |
| EP | 2728770 | A2 | 5/2014 |
| EP | 2779473 | A2 | 9/2014 |
| FR | 2689249 | A1 | 10/1993 |
| GB | 2308034 | A | 6/1997 |
| JP | 1992078584 | | 7/1992 |
| JP | 1998221429 | | 8/1998 |
| JP | 2002286831 | | 10/2002 |
| JP | 2008164479 | | 7/2008 |
| KR | 20080020078 | a | 3/2008 |
| WO | 9306502 | A1 | 4/1993 |
| WO | 99039517 | A3 | 10/1999 |
| WO | 0011823 | A1 | 3/2000 |
| WO | 0041340 | A1 | 7/2000 |
| WO | 2005050241 | A3 | 6/2005 |
| WO | 2012024507 | A2 | 2/2012 |

OTHER PUBLICATIONS

Japanese Office Action for Patent Application No. 2016-568024; dated Oct. 31, 2017; 2 pages.

Ahnstrom et al., "Detection and direction-finding of spread spectrum signals using correlation and narrowband interference rejection", Proc. Nordic Matlab Conference, Copenhagen, Denmark, 2003, 5 pages.

Akpa et al., "N-parallel filter bank equivalent to tree structure", Electrical and Computer Engineering Conference Proceedings, 1994, pp. 494-496.

Balakrishnan et al., "Implementation of radix-2 and split-radix fast fourier transform algorithm using current mirrors", 2013 International Conference on Circuits, Power and Computing Technologies (ICCPCT), IEEE, Mar. 20, 2013, pp. 730-735.

Chang et al., "Reconfigurable Architectures for Low Complexity Software Radio Channelizers using Hybrid Filter Banks," 10th IEEE Singapore International Conference on Communication systems, Oct. 2006, pp. 1-5.

Darak et al., "A reconfigurable filter bank for uniform and non-uniform channelization in multi-standard wireless communication receivers," IEEE 17th International Conference on Telecommunications (ICT), Apr. 4-7, 2010, pp. 351-956.

Holler et al. "A 2-20-GHz Analog Lag Correlator for Radio Interferometry", IEEE Transactions on Instrumentation and Measurement, vol. 61, No. 8, Aug. 2012, pp. 2253-2261.

Houghton et al., "Direction finding on spread-spectrum signals using the time-domain filtered cross spectral density", IEEE Proceedings of Radar, Sonar and Navigation, vol. 144, No. 6, Dec. 1997, pp. 315-320.

International Search Report and Written Opinion; International Application No. PCT/US2015/016298; International Filing Date: Feb. 18, 2015; dated May 11, 2015; 14 pages.

International Search Report and Written Opinion; International Application No. PCT/US2015/033207; International Filing Date: May 29, 2015; dated Sep. 17, 2015; 11 pages.

International Search Report and Written Opinion; PCT Application No. PCT/US2015/025537; International Filing Date: Apr. 13, 2015; dated Jul. 28, 2015; 12 pages.

International Preliminary Report on Patentability for PCT/US2015/016298, dated Aug. 23, 2016, 8 pages.

International Preliminary Report on Patentability for PCT/US2015/039877, dated Mar. 21, 2017, 8 pages.

International Preliminary Report on Patentability for PCT/US2015/033207, dated Dec. 6, 2016, 7 pages.

International Preliminary Report on Patentability for PCT/US2015/025537, dated Dec. 20, 2016, 7 pages.

Lambrecht et al., "True-Time-Delay Beamforming With a Rotman-Lens for Ultrawideband Antenna Systems", IEEE—Transactions on Antennas and Propagation, vol. 58, No. 10, Oct. 2010, pp. 3189-3195.

Lehne et al., "A 0.13-um 1-GS/s CMOS Discrete-Time FFT Processor for Ultra-Wideband OFDM Wireless Receivers", IEEE Transactions on Microwave Theory and Techniques, vol. 59, No. 6, Jun. 2011, pp. 1639-1650.

Lillington, "Flexible channelisation architectures for Software Defined Radio front ends using a Tuneable Pipelined Frequency Transform", IET Seminar Digest, vol. 2003, No. 1, 2003, pp. 1-13.

Lillington, "The pipelined frequency transform (PFT)", RF Engines, Electronic Engineering, Jun. 17, 2002, pp. 1-5.

Mahesh et al., "Coefficient decimation approach for realizing reconfigurable finite impulse response filters," IEEE International Symposium on Circuits and Systems, ISCAS, May 18-21, 2008, pp. 81-84.

Mahesh et al., "Reconfigurable low area complexity filter bank architecture based on frequency response masking for nonuniform channelization in software radio receivers", IEEE Transactions on Aerospace and Electronic Systems, vol. 47, No. 2, Apr. 2011, pp. 1-15.

Navarro et al., "Non-uniform channelization methods for next generation SDR PMR base stations", 2011 IEEE Symposium on Computers and Communications, Jul. 2011, pp. 620-625.

PCT International Search Report and Written Opinion; International Application No. PCT/US2015/039877; International Filing Date: Jul. 10, 2015; dated Oct. 6, 2015; 12 pages.

SJU, "Pipelined Frequency Transform PFT", RF Engines Limited Data Sheet, Apr. 29, 2002, pp. 1-25.

Smitha et al., "A new low power reconfigurable decimation interpolation and masking based filter architecture for channel adaptation in cognitive radio handsets," Physical Communication, 2, Jan. 2009, pp. 47-57.

(56) References Cited

OTHER PUBLICATIONS

Suh et al., "Low-Power Discrete Fourier Transform for OFDM: A Programmable Analog Approach", IEEE Transactions on Circuits and Systems I: Regular Papers, IEEE, vol. 58, No. 2, Feb. 1, 2011, pp. 290-298.

Zhang et al., "Reconfigurable beam forming using phase-aligned Rotman lens", www.ietdl.org, The Institute of Engineering and Technology, 2012, pp. 326-330.

* cited by examiner

US 10,084,587 B1

MULTIFUNCTION CHANNELIZER/DDC ARCHITECTURE FOR A DIGITAL RECEIVER/EXCITER

BACKGROUND

The present disclosure relates to electronics, and more specifically, to a detection of objects.

Hardware implementations for wideband systems cannot keep up with demanding bandwidth requirements. Therefore, a channelizer may be used to reduce a band into sub-bands, where each of the sub-bands is processed on parallel channels.

Channelizer circuits are designed for static channels and are defined at compile time. However, dynamic channels are needed to react to an ever-changing radio frequency (RF) environment. For example, an emitter object (e.g., a threat such as air, ground, sea, and/or space radar) to be detected can effectively hop center frequencies and possibly, at least temporarily, elude detection. Furthermore, the object or threat might only be detectable for short periods of time (e.g., a so-called pop-up or pulse object/threat). Conventional receiver architectures may fail to capture such pop-up or pulse objects/threats.

SUMMARY

According to a non-limiting embodiment, a digital receiver includes a digital synthesizer that generates a local oscillating (LO) signal at a selected frequency, and a signal mixer that receives an input signal and generates a mixed output signal in response to shifting a phase of the input signal based on the frequency of the LO signal. A multi-mode dynamic channelizer is selectively operable in a first mode and a second mode. The first mode generates a plurality of individual channels having a channel size defined by a bandwidth and a gain, and the second mode generates a parallelization of a selected channel. In response to operating in the second mode, the multi-mode dynamic channelizer adjusts at least one of the bandwidth and the gain of the selected channel based on the mixed output signal to change the channel size of the selected channel.

According to another non-limiting embodiment, a multi-mode dynamic channelizer included in a digital receive comprises an adaptive filter configured to actively adjust a bandwidth of a respective complex RF channel to generate at least one filtered complex RF signal. At least one Fourier transfer module is configured to generate a complex output signal at baseband based on the at least one filtered complex RF signal. The multi-mode channelizer further includes a mode selector module in signal communication with the adaptive filter. The mode selector module is configured to command the adaptive filter to generate a plurality of individual channels in response to receiving a first mode select signal indicative of a first operating mode, and to command the adaptive filter to generate a parallelization of a selected channel in response to receiving a second mode select signal indicative of a second operating mode that is different from the first operating mode.

According to yet another non-limiting embodiment, a method of processing an input signal received at a digital receiver comprises generating a local oscillating (LO) signal at a selected frequency, and mixing the input signal with the LO signal to generate a mixed output signal having a phase that is shifted with respect to an input phase of the input signal. The method further comprises operating a multi-mode dynamic channelizer in a first mode that processes the mixed output signal to generate a plurality of individual channels having a channel size defined by a bandwidth and a gain, and a second mode that processes the mixed output signal to generate a parallelization of a selected channel.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
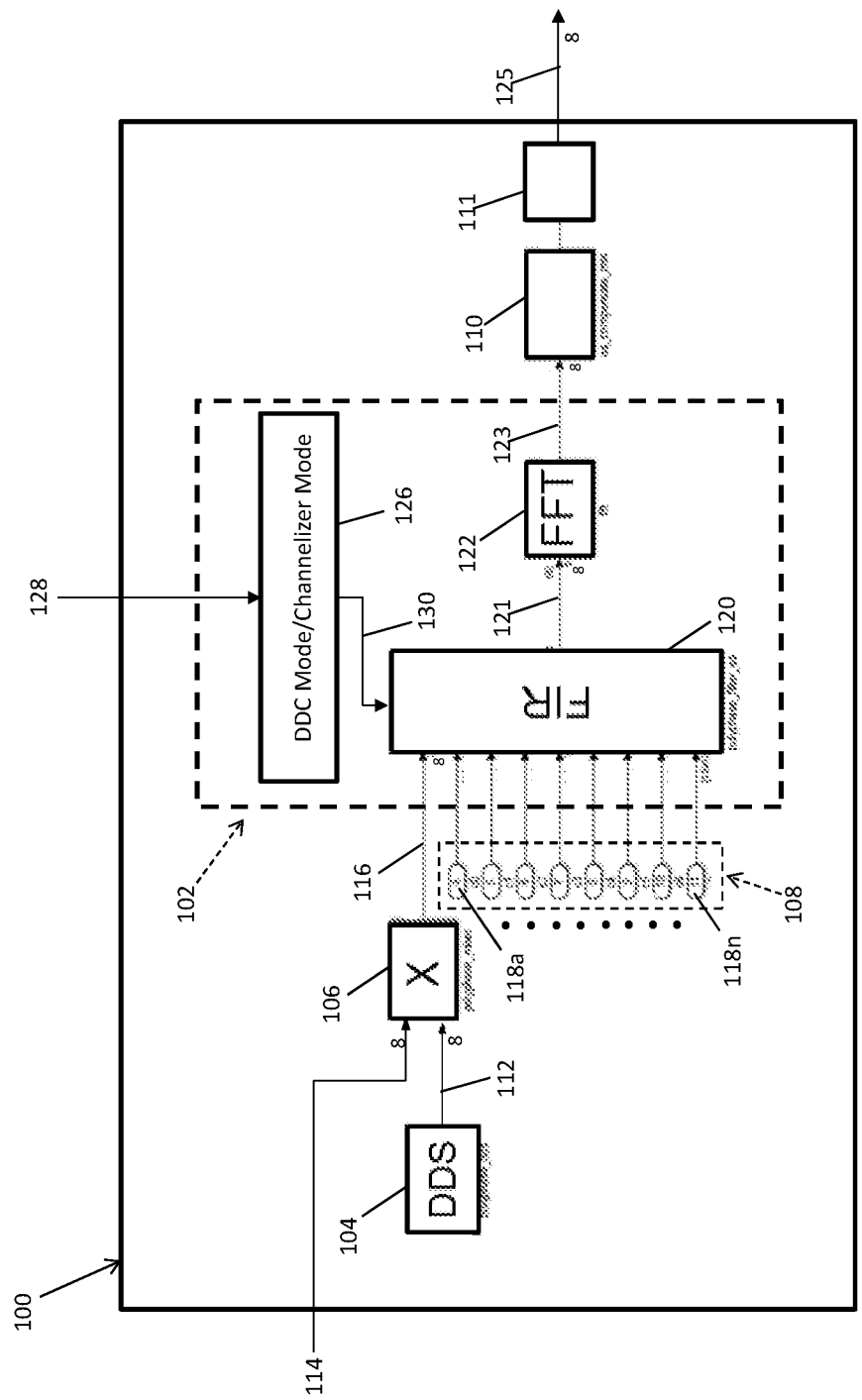
FIG. 1 is a block diagram of a digital receiver including a multi-mode dynamic channelizer according to a non-limiting embodiment.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Turning to an overview of the relevant technical concepts, many digital system personalities are required to address an array of applications including radar, electronic warfare (EW), and electronic signal communications. For example, in some cases, medium dynamic range with a wide bandwidth is desired for EW applications, but a high dynamic range with a small bandwidth is desired for radar-specific applications. Radar systems are expected to operate in different modes. Each mode requires different performance specifications and thus is typically implemented using different processing techniques which are tailored to a given application. Conventional systems do not provide a "one processor fits all" paradigm, or a solution to quickly time multiplex between multiple solutions at the nanosecond timescale for multifunction applications where radar, EW, and electronic signal communications are performed simultaneously. Some conventional systems attempt to achieve simultaneous processing performance by processing the input signal with a digital down converter (DDC) prior to performing channelization using a separate (i.e., independent) channelizer. However, implementing a separate DDC and channelizer in the same design consumes excessive FPGA resources, which further constrains processing resources.

Various non-limiting embodiments of apparatuses, systems, and methods are described herein for providing a digital electronic receiver that includes a fully reconfigurable, dynamic, and adaptable channelizer architecture across a wideband spectrum. The channelizer architecture includes a multi-mode dynamic channelizer circuit (i.e., channelizer) that is capable of operating in a selected signal processing mode among a plurality of different signal processing modes. The processing mode of the channelizer can be selected by inputting a mode select signal to the digital receiver. Based on the signal processing mode, the channelizer processes a received input signal and outputs the desired output data corresponding to the selected processing mode.

Turning now to FIG. 1, a digital receiver 100 is illustrated according to a non-limiting embodiment. The digital receiver 100 includes a multi-mode dynamic channelizer 102, a digital synthesizer 104, a signal mixer 106, a coefficient input module 108, an electronic digital mixer 110, and a DDC controller 111. The digital synthesizer 104 can be constructed as a direct/discrete digital synthesizer (DDS), and generates a local oscillating (LO) frequency signal 112 (e.g., sinewave) according to parameters (e.g., a selected frequency) set by a LO control circuit (not shown). The LO frequency signal 112 is utilized to actively tune a center of frequency of a selected channel. The signal mixer 106 is in signal communication with the digital synthesizer 104, and mixes the LO frequency signal 112 with a targeted RF input signal 114 to generate a mixed output signal 116 having a shifted frequency with respect to the frequency of the targeted RF input signal 114. The input signal 114 can be received as a real value or a complex value including a real component (I) and an imaginary component (Q). The shifted frequency set by the mixed output signal 116 output by the mixer 106 allows for selecting a center frequency of a selected channel of the channelizer 102.

The multi-mode dynamic channelizer 102 is in signal communication with the mixer 106 and the coefficient input module 108. The mixer 106 delivers the mixed output signal 116 to the multi-mode dynamic channelizer 102. The coefficient input module 108 outputs one or more coefficient parameters 118a-118n. The coefficient parameters 118a-118n can modify a characteristic of one or more complex RF channels input to the multi-mode dynamic channelizer 102. The characteristics include, but are not limited to, a selected non-zero frequency, a gain, and a selected center frequency. For example, the coefficient parameters 118a-118n can be digitally set to create a bandpass filter for passing a signal at a certain non-zero frequency, to select a center frequency value, etc. In at least one embodiment, the coefficient parameters 118a-118n are generated at 10-bit resolution and operate at 89 mW active power with bias set for a 70 dB dynamic range. The coefficients parameters can be set to a low pass configuration with a fixed cutoff frequency that is the ratio of the sampling frequency, $f_s$, to the number of channels, M (e.g. $f_{cutoff}=f_s/M$). Accordingly, at least one embodiment is capable of changing the coefficients so that the cutoff frequency is less or more than $f_s/M$.

The multi-mode dynamic channelizer 102 includes an adaptive filter 120, and one or more Fourier transfer modules 122. The adaptive filter 120 is an adaptive (i.e., tunable) polyphase decimating finite impulse response (FIR) filter array. The FIR filter array 120 processes one or more input signals delivered from the mixer 106, such as a complex RF input signal (I, Q), for example, and generates one or more filtered output RF signals. The adaptive filter 120 may operate as a bandpass filter, high-pass filter, or a low-pass filter, as needed, so as to independently adapt (i.e., tune) an individual channel.

The Fourier transform module 122 is in signal communication with the adaptive filter 120, and receives one or more complex RF output channels 121 from the adaptive filter 120. The channels input to the Fourier transform module 122 are simultaneously represented as a filtered "polyphased" response. Based on the complex RF channels 121, the Fourier transform module 122 generates a number of real value output signals, or output channels 123. Following output from the Fourier transform module 122, the channels 123 are centered, or are output "at baseband".

The electronic digital mixer 110 is in signal communication with the Fourier transform module 122 to receive the real value output signals 123, i.e., the baseband channel signals 123. The digital mixer 110 can digitally convert a digitized, band limited signal to a lower frequency signal at a lower sampling rate. In at least one embodiment, the digital mixer 110 samples the real output signals 123 according to a sample clock rate. In at least one embodiment, the digital mixer 110 compensates for the frequency space when an "oversampled" channelizer is embodied. In the manner, the digital mixer 110 can correct a frequency offset and ensures that the output of digital mixer 110 is substantially at baseband.

The DDC controller 111 is provided downstream from the digital mixer 110 and can generate a decimated baseband output signal 125 that can be further bit packaged, tagged and analyzed. In some embodiments, the decimated baseband output signal 125 is a polyphased output signal, while in other embodiments the decimated baseband output signal 125 is not polyphased.

The multi-mode dynamic channelizer 102 further includes a mode selector module 126. The mode selector module 126 receives a mode select signal 128 (e.g., input by a user) which indicates a selected operating mode of the multi-mode dynamic channelizer 102 from among a plurality of different operating modes. The selected mode of the multi-mode dynamic channelizer 102 can be automatically selected based on the characteristics of the mixed output signal 116 or can be manually selected.

The available operating modes indicated by the mode-select signal include, for example, a radar mode, an EW mode, communications mode. When operating in the radar mode or the communications mode, for example, the multi-mode dynamic channelizer 102 performs DDC to decimate mixed signal 116 to a lower bandwidth. When operating in the EW mode, for example, the multi-mode dynamic channelizer 102 operates to decimate sub-bands of the mixed signal 116 and output a full spectrum coverage of the full spectrum of the input signal, or a subset of the full spectrum. In response to the mode select signal, the mode selector module 126 outputs a mode command signal 130 that commands the adaptive filter 120 to operate according to the mode indicated by the mode select signal 128. For example, in response to invoking the channelizer mode, the adaptive filter 120 utilizes the coefficient parameters 118a-118n to generate a plurality of individual complex RF channels 121. Each complex RF channel 121 has a channel size defined by a bandwidth and a gain.

When invoking the DDC mode, however, the adaptive filter 120 generates a parallelization of a selected individual channel. In at least one non-limiting embodiment, the "parallelization" signal processing operation can be defined as polyphasing the representation of a selected channel among a plurality of input channels. Accordingly, when operating in the DDC mode, the multi-mode dynamic channelizer 102 can adjust at least one of the bandwidth, the gain and the center frequency of an individual complex RF channel 121 based on the coefficient parameters 118a-118n and/or the mixed output signal 116 to change the channel size and/or center frequency of an individual complex RF channel 121 or targeted complex RF channel 121.

Figure 2:
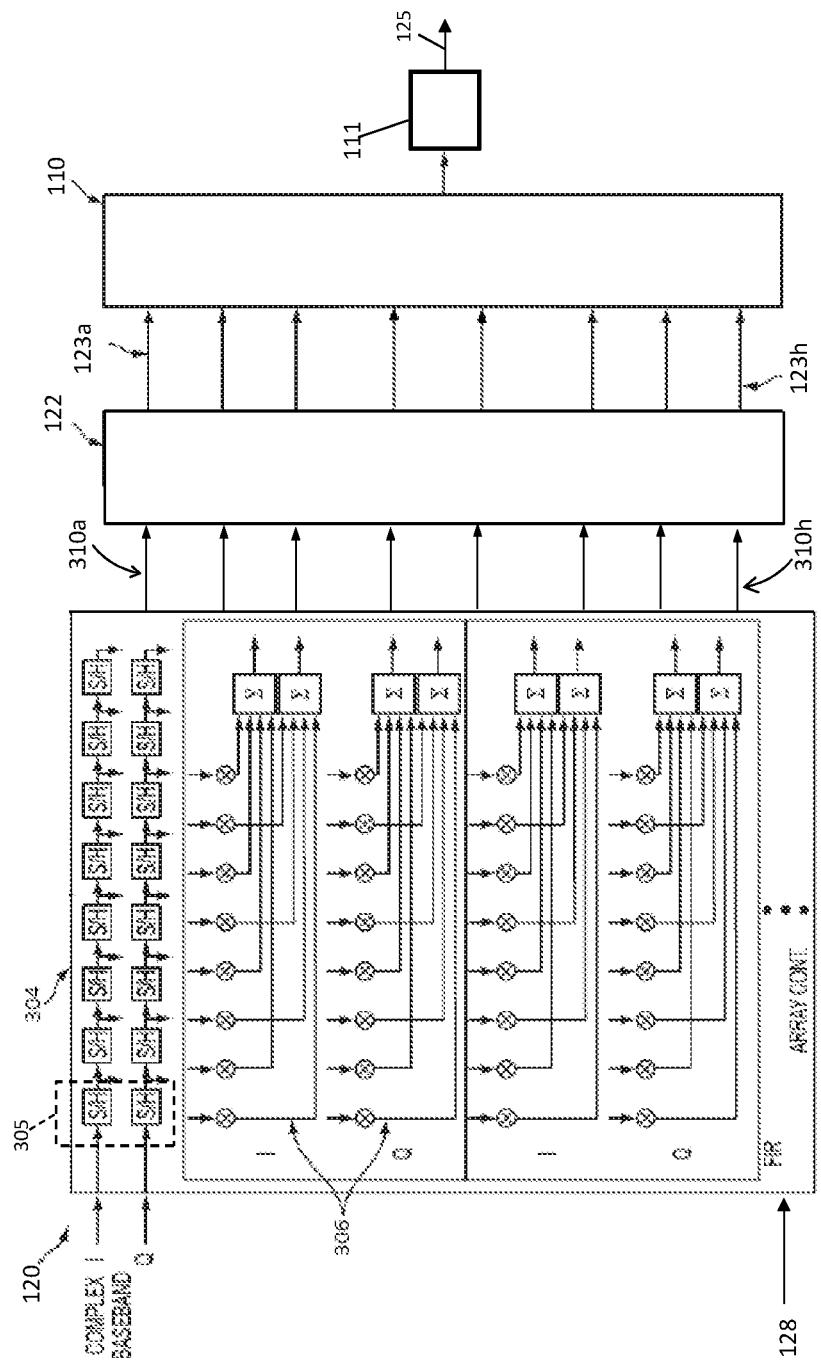
FIG. 2 is a block diagram of an adaptive filter included in a multi-mode dynamic channelizer according to a non-limiting embodiment.

With reference to FIG. 2, an adaptive filter 120 constructed as a polyphase FIR filter array is illustrated according to a non-limiting embodiment. The adaptive FIR filter 120 can include 16 taps and can be driven by a 3.25 gigahertz (GHz) clock. The analog bandwidth of the adaptive FIR filter 120 may reach up to 12 GHz. In at least one embodiment, the adaptive FIR filter 120 is capable of converting a plurality of polyphase signals into one or more up-sampled baseband channels (e.g., I/Q channels).

The adaptive FIR filter 120 further includes a plurality of sample and hold (S/H) circuits 304. In at least one embodiment, the S/H circuits are arranged in pairs 305 that correspond to a respective pair of I/Q channels. Each S/H pair 305 also corresponds to a real value output baseband channel 123a-123h. In at least one non-limiting embodiment, the S/H output signals are routed to a plurality of FIR filter branches 306 which are in signal communication with the Fourier transfer module 122. The branches 306 can be dynamically tapped to actively reconfigure the adaptive FIR filter 120.

The Fourier transform module 122 receives from the adaptive FIR filter 120 one or more baseband channels such as, I/Q channels 310a-310h, for example, and generates a number of complex IF output signals 123a-123h. The complex IF signals 123a-123h are delivered to the digital mixer 110 which samples one or more of the real value output baseband signals 123a-123h. For example, a complex IF signal 123a is output on a first clock cycle, a second complex IF signal 123b is output on a second clock cycle, etc. The complex IF signals 123a-123h can be up-sampled and are clocked at 3.25 GHz rate, for example. The DDC controller 111 combines the complex IF signals 123a-123h to form a decimated RF output signal 125 that is clocked at, for example, 26 GHz. In one or more embodiments, the adaptive FIR filter 120 and the Fourier transform module 122 are clocked at 3.25 GHz, for example, and the digital mixer 110 is clocked at, for example, 26 GHz.

In at least one embodiment, the DDC controller 111 is disposed as the last stage. Thus, the adaptive FIR filter 120 can selectively apply a first decimation to a mixed complex RF input signal, i.e., when the DDC mode is invoked via mode select signal 128. The output of the FIR filter 120 is then converted into complex IF signals 123a-123h via the Fourier transfer module 122, for example, which can be further decimated into a decimated output signal 125 generated by the DDC controller 111. It should be appreciated that any number of the complex IF signals 123a-123h can be used. Accordingly, if the adaptive FIR filter 120 allows four sets of complex RF input channels and data is only provided through one of the channels, the other remaining channels can be "grounded" and left unused. A number of digital to analog converters can be included to provide the inputs to these complex baseband channels into the adaptive FIR filter 120.

According to at least one embodiment, the adaptive FIR filter 120 shown in FIG. 2 can be used to implement down conversion to baseband and filtering, known as bandpass sampling. The coefficient parameters 118 of the FIR filter module 120 can be digitally set via the coefficient input module 108 (not shown in FIG. 2), for example. Accordingly, the adaptive FIR filter 120 provides a very flexible filter capable of implementing an arbitrary filter shape, which is controlled by the number of filter taps. In at least one embodiment, the FIR filter coefficient parameters are set to create a bandpass filter to pass a signal at a certain non-zero frequency.

Various subsampling techniques can then be used such that once the signal is bandpass filtered. In at least one embodiment, a sampling rate much lower than the Nyquist criterion can be used to alias the signal down to baseband. For example, an initial signal with bandwidth of about 10 megahertz (MHz) can be digitized at a center frequency of about MHz 200 to about 210 MHz by utilizing the adaptive FIR filter 120 as a bandpass filter that is set at approximately 200 MHz to approximately 210 MHz. The resulting signal can then be sampled at approximately 50 MHz, for example. The digitized signal (i.e., the signal digitized at about 200 MHz to about 210 MHz) is aliased down to approximately a 50 MHz sampling window. It should be appreciated that the frequency values described above are merely examples, and that other frequencies may be implemented. A low-pass filter can then be applied to the sampled signal to filter out the aliases thereby obtaining the information that was carried on the digitized signal. In this manner, the adaptive FIR filter 120 is utilized to bandpass filter and then downsample the initial signal.

Figure 3:
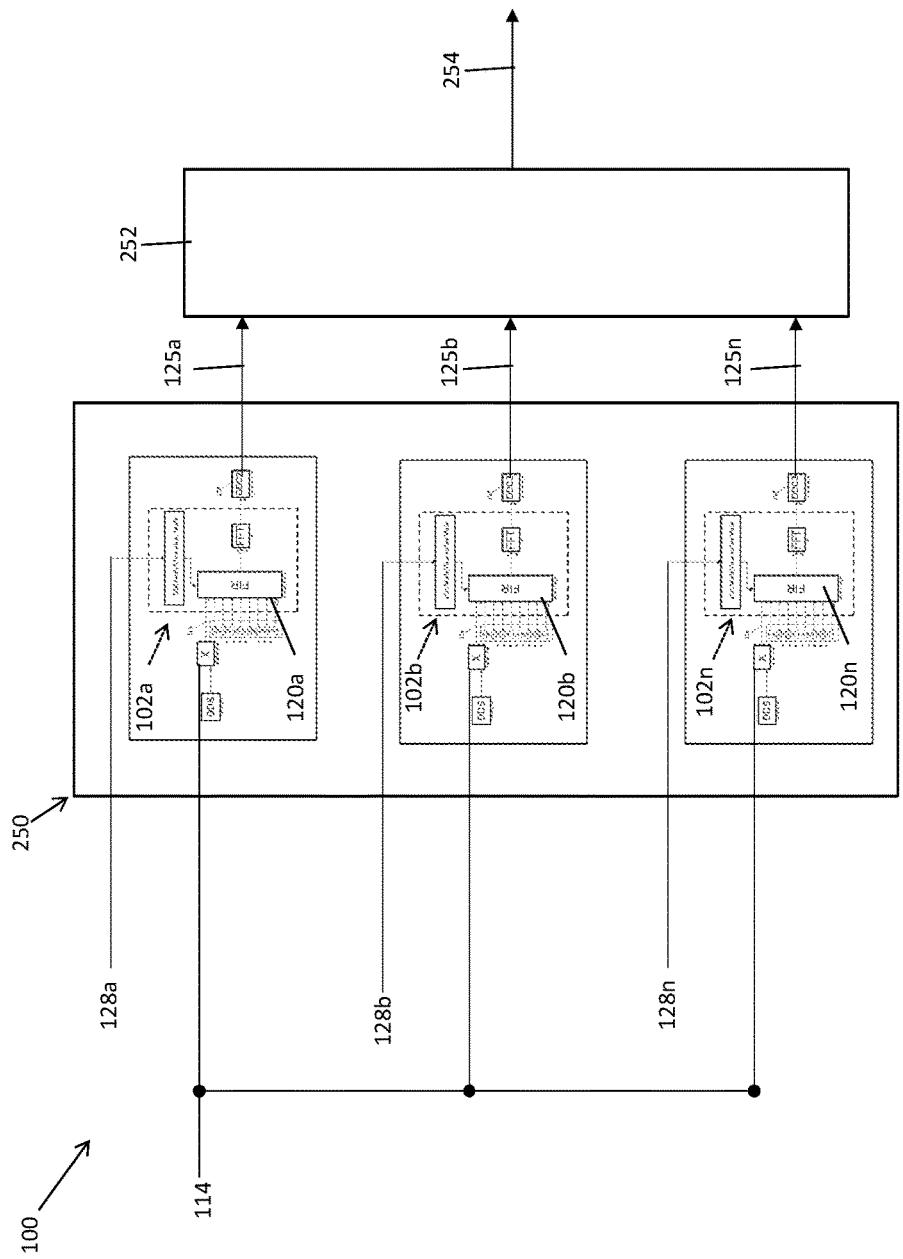
FIG. 3 is a block diagram of a digital receiver including a multi-mode channelizer bank according to a non-limiting embodiment.

Turning now to FIG. 3, a digital receiver 100 is illustrated including a multi-mode channelizer bank 250 having an array of independent multi-mode dynamic channelizers 102a, 102b, 102n. In at least one embodiment, each adaptive filter 120a-120n included in a respective multi-mode dynamic channelizers 102a-102n can be set to bandpass different frequency channels. The multi-mode dynamic channelizers 102a-102n can be connected according to various architectures such as a parallel connection or in a daisy-chain connection.

Each multi-mode dynamic channelizer 102 is capable of independently tuning a respective adaptive filter 120 with respect to the channels of a given multi-mode dynamic channelizer 102. Mode select signals 128a-128n can be input to each multi-mode dynamic channelizer 102 to invoke an operating mode as described above. A daisy-chain arrangement of the multi-mode dynamic channelizers 102a-102n, for example, allows for outputting individual decimated output signals 125a-125n from each multi-mode dynamic channelizer 102 included in the multi-mode channelizer bank 250. A DDC/data packaging controller 252 can perform bit packaging and data tagging on each individual decimated output signal 125a-125n, to achieve additional decimation, and can exchange a data signal 254 representing the decimated output signals 125a-125n with various additional devices or systems to perform further analysis, if necessary. Accordingly, multi-mode channelization can be performed across a wider spectrum, while packing the spectrum at a minimum data rate.

Figure 4:
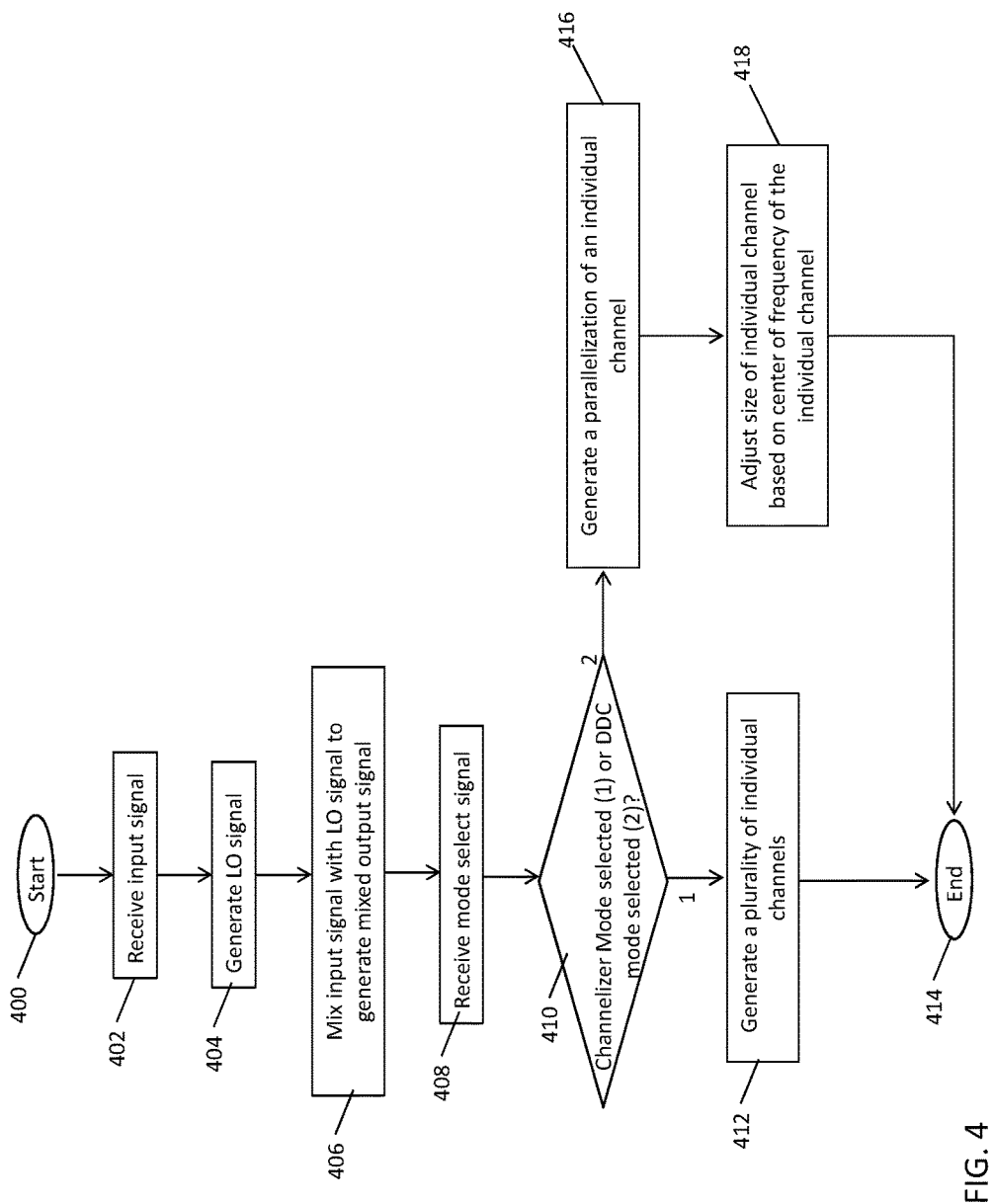
FIG. 4 is a flow diagram illustrating a method of processing an input signal received at a digital receiver according to a non-limiting embodiment.

With reference now to FIG. 4, a flow diagram illustrates a method of processing an input signal received at a digital receiver according to a non-limiting embodiment. The method begins at operation 400, and at operation 402 an input signal is received at the digital receiver 100. At operation 404, a LO signal with a selected frequency is generated via digital synthesizer 104. At operation 406, the input signal is mixed with the LO signal, via a signal mixer 106, to generate a mixed output signal having a phase that is shifted with respect to the input signal. The phase can be shifted based on the selected frequency of the LO signal. At operation 408, a mode select signal 128 is received at multi-mode dynamic channelizer 102. The mode select signal 128 invokes a particular signal processing mode of the multi-mode dynamic channelizer 102 included in the digital receiver 100. For example, the multi-mode dynamic channelizer 102 can be selectively transitioned between a channelizer mode and a DDC mode. It should be appreciated that the multi-mode dynamic channelizer 102 can be constructed to operate in additional modes, and that the mode select signal 128 can select any mode among the available processing modes of the multi-mode dynamic channelizer 102.

At operation 410, the selected operating mode of the multi-mode dynamic channelizer 102 is determined. When a first mode is selected (e.g., the channelizer mode), the multi-mode dynamic channelizer 102 generates a plurality of individual channels, via an adaptive filter 120, based on the mixed output signal at operation 412, and the method ends at operation 414. When a second mode is selected (e.g., the DDC mode), however, the multi-mode dynamic channelizer 102 adjusts the coefficient parameters of the adaptive filter 120 to perform a parallelization of an individual complex RF channel, via the adaptive filter 120, at operation 416. In at least one embodiment, the parallelization of the individual complex RF channel includes adjusting a size of a selected individual channel at operation 418. The size of the channel is adjusted based on a center frequency and bandwidth of the individual channel, and the method ends at operation 414. It should be appreciated that the output of the multi-mode dynamic channelizer 102 can be further processed by a Fourier transfer modules 122 to generate one or more complex IF signals 123*a*-123*h*, which can further be decimated via a DDC controller 111 to generate a decimated output signal 125.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

As used herein, the term "module" refers to an application specific integrated circuit (ASIC), an electronic circuit, a microprocessor, a computer processor (shared, dedicated, or group) and memory that executes one or more software or firmware programs, a combinational logic circuit, a microcontroller including various inputs and outputs, and/or other suitable components that provide the described functionality. The module is configured to execute various algorithms, transforms, and/or logical processes to generate one or more signals of controlling a component or system. When implemented in software, a module can be embodied in memory as a non-transitory machine-readable storage medium readable by a processing circuit (e.g., a microprocessor) and storing instructions for execution by the processing circuit for performing a method. A controller refers to an electronic hardware controller including a storage module capable of storing algorithms, logic or computer executable instruction, and that contains the circuitry necessary to interpret and execute instructions.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A digital receiver, comprising:
   a digital synthesizer that generates a local oscillating (LO) signal at a selected frequency;
   a signal mixer that receives an input signal and generates a mixed output signal in response to shifting a phase of the input signal based on the frequency of the LO signal; and
   a multi-mode dynamic channelizer selectively operable in a first mode and a second mode, the first mode configured to generate a plurality of individual channels having a channel size defined by a bandwidth and a gain, and a second mode configured to generate a parallelization of a selected channel,
   wherein in response to operating in the second mode, the multi-mode dynamic channelizer adjusts at least one of the bandwidth and the gain of the selected channel based on the mixed output signal to change the channel size of the selected channel.

2. The digital receiver of claim 1, further comprising a coefficient input module configured to output at least one coefficient parameter that modifies a characteristic of the given channel.

3. The digital receiver of claim 2, wherein the characteristic is at least one of a selected non-zero frequency and a selected center frequency.

4. The digital receiver of claim 2, wherein in response to operating in the second mode, the multi-mode dynamic channelizer changes the channel size of the selected channel based further on the at least one coefficient parameter.

5. The digital receiver of claim 4, wherein the multi-mode dynamic channelizer comprises:
   an adaptive filter configured to actively adjust a bandwidth of the given channel based on the first and second modes to generate at least one steered output RF signal; and
   at least one Fourier transfer module configured to generate at least one baseband output signal indicative of a real value based on the at least one steered output RF signal.

6. The digital receiver of claim 5, wherein the adaptive filter is an adaptive polyphase decimating finite impulse response (FIR) filter array.

7. The digital receiver of claim 5, further comprising a mode selector module in signal communication with the adaptive filter, the mode selector module configured to command the adaptive filter to generate the plurality of individual channels in response to receiving a first mode select signal that selects the first mode, and to command the adaptive filter to generate the parallelization of the selected channel in response to receiving a second mode select signal that selects that second mode.

8. The digital receiver of claim 7, further comprising a digital down converter (DDC) in signal communication with the Fourier transform module, the DDC configured to output a real RF output signal in response to sampling the output signal of the Fourier transfer module according to a sample clock rate.

9. A multi-mode dynamic channelizer included in a digital receiver, the multi-mode dynamic channelizer comprising:
an adaptive filter configured to actively adjust a bandwidth of a respective complex RF channel to generate at least one filtered complex RF signal;
at least one Fourier transfer module configured to generate a complex output signal at baseband based on the at least one filtered complex RF signal; and
a mode selector module in signal communication with the adaptive filter, the mode selector module configured to command the adaptive filter to generate a plurality of individual channels in response to receiving a first mode select signal indicative of a first operating mode, and to command the adaptive filter to generate a parallelization of a selected channel in response to receiving a second mode select signal indicative of a second operating mode that is different from the first operating mode.

10. The multi-mode dynamic channelizer 9, wherein the adaptive filter is an adaptive polyphase decimating finite impulse response (FIR) filter array.

11. The multi-mode dynamic channelizer of claim 9, wherein in response to operating in the second mode, the adaptive filter generates the parallelization of the selected channel based on a mixed output signal having a phase that is shifted with respect to an input signal received by the digital receiver.

12. The multi-mode dynamic channelizer of claim 11, wherein generating the parallelization of the selected channel includes adjusting at least one of the bandwidth and the gain of the selected channel to change the channel size of the selected channel.

13. The multi-mode dynamic channelizer of claim 12, wherein the adaptive filter receives at least one coefficient parameter that modifies a characteristic of the selected channel.

14. The multi-mode dynamic channelizer of claim 13, wherein the characteristic is at least one of a selected non-zero frequency and a selected center frequency.

15. The multi-mode dynamic channelizer of claim 14, wherein in response to operating in the second mode, the adaptive filter changes the channel size of the selected channel based further on the at least one coefficient parameter.

16. A method of processing an input signal received at a digital receiver, the method comprising:
generating a local oscillating (LO) signal at a selected frequency;
mixing the input signal with the LO signal to generate a mixed output signal having a phase that is shifted with respect to an input phase of the input signal;
operating a multi-mode dynamic channelizer in a first mode that processes the mixed output signal to generate a plurality of individual channels having a channel size defined by a bandwidth and a gain; and
operating the multi-mode dynamic channelizer in a second mode that processes the mixed output signal to generate a parallelization of a selected channel.

17. The method of claim 16, further comprising adjusting at least one of the bandwidth and the gain of the selected channel based on the mixed output signal to change the channel size of the selected channel.

18. The method of claim 1, further comprising modifying at least one characteristic of the selected channel based on a received coefficient parameter.

19. The method of claim 18, wherein the at least one characteristic includes at least one of a selected non-zero frequency and a selected center frequency.

20. The method of claim 19, further comprising changing the channel size of the selected channel based on the at least one coefficient parameter.

* * * * *